United States Patent [19]
Maters

[11] 3,710,919
[45] Jan. 16, 1973

[54] SELF-ARRANGING CONVEYOR
[75] Inventor: Jan Maters, Nieuwkoop, Netherlands
[73] Assignee: Blom & Maters Machinefabriek N.V., Aarlanderveen, Netherlands
[22] Filed: April 20, 1971
[21] Appl. No.: 135,549

[30] Foreign Application Priority Data

April 21, 1970  Netherlands ...................... 7005742

[52] U.S. Cl. ........................................ 198/30, 193/27
[51] Int. Cl. .............................................. B65g 47/26
[58] Field of Search ................ 198/30, 32; 193/27, 28

[56] References Cited

UNITED STATES PATENTS 3,240,311  3/1966  Hofer et al. ........................... 198/34
2,555,602  6/1961  Nutt ................................... 198/30 X
2,980,229  4/1961  Carter .................................... 198/76
3,145,825  8/1964  Carter .................................... 198/30

FOREIGN PATENTS OR APPLICATIONS 1,241,341  5/1967  Germany ............................... 198/30

Primary Examiner—Richard E. Aegerter
Assistant Examiner—Douglas D. Watts
Attorney—Cushman, Darby & Cushman

[57] ABSTRACT

Containers supplied in a random fashion are arranged in single file by being caused to follow a zig-zag path on a conveyor.

2 Claims, 1 Drawing Figure

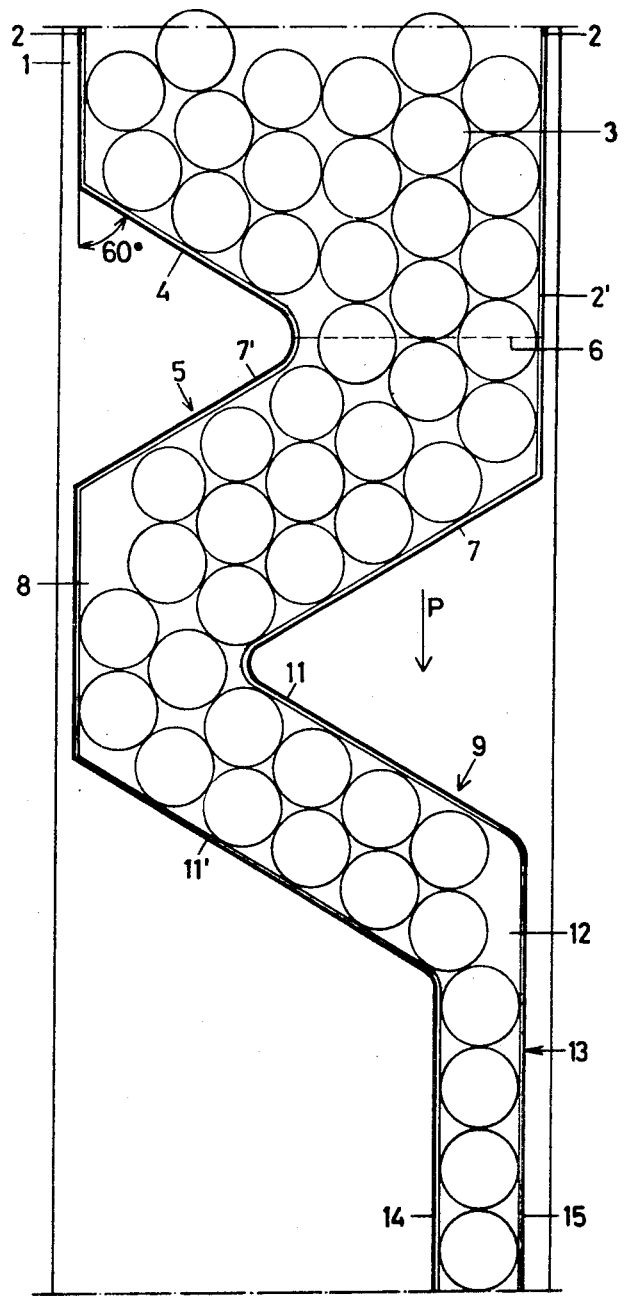

SELF-ARRANGING CONVEYOR

This invention relates to a conveyor including a conveyor belt for a container-handling production line, serving to reduce disorderly or random arrangements to single-file transport. Such conveyors are known in may embodiments, which, however have not hitherto overcome the problem of jamming of the containers during the reduction of the number of rows.

It is an object of the present invention to provide a simple conveyor of this kind, in which this problem is not encountered.

According to the invention there is provided a conveyor for a container handling production line including at least one conveyor belt, serving to reduce disorderly or random arrangements to single-file transport, characterized by stationary guides extending obliquely relative to a direction of transport, which guides cause the containers to follow a zig-zag path over the conveyor belt, the entrance to a first leg of the zig-zag path being formed by a pair of first guides which converge in the direction of transport until they are spaced a distance which, measured transversely of the conveyor belt, is only slightly more than thrice the diameter of the containers to be transported, which first guides merge into a pair of substantially parallel second guides forming the first leg of the zig-zag path, said second guides being spaced apart a distance slightly more than the width occupied by three off-set rows of containers, said first leg of the zig-zag path merging into a second leg through a passage which, measured in the transverse direction, has a minimum width slightly more than twice the diameter of the containers to be transported, the second leg of the zig-zag path being formed by a pair of substantially parallel third guides spaced apart a distance slightly more than the width occupied by two off-set rows of containers, said second leg of the zig-zag path merging into a path for a single row of containers extending in the direction of transport.

One embodiment of the invention will be described, by way of example, with reference to the accompanying drawing, which illustrates a diagrammatic plan view of an apparatus according to the invention.

Referring to the drawing, there is shown a conveyor belt 1, driven in the direction of arrow P. Containers 3 are supplied in random fashion between first guides 2. These containers may, for example, be bottles which have to pass a filling machine in single file further on in the production line. Inlet guides 2' and 4 compact containers 3 together to a formation of three side-by-side files, which constitutes an important principle of the invention, namely, the concept that three rows of containers advanced in side-by-side relationship can never become jammed. After having passed region 6, which unlike the showing in the drawing, may have some length in the direction of transport, mutually parallel second guides 7 and 7' begin to affect the three-row arrangement. Owing to the inclined position of the second guides 7,7' relative to the direction of travel of conveyor belt 1, as well as the selected distance between guides 7 and 7', the three rows of containers in the first leg 5 of the zig-zag path become off-set to be forced to zone 8 at the outlet of leg 5 in this formation. Zone 8 constitutes a passage from the first leg 5 to a second leg 9 of the zig-zag path. In this passage 8, a movement in the direction of transport is imparted to the groups of containers over a short trajectory, in which, however, they are advanced in a non-jamming formation. According to the invention, the smallest width of passage 8 should only be a little wider than twice the diameter of one container. Subsequently the containers enter the second leg 9 of the zig-zag path, which is formed by a pair of substantially parallel third guides 11 and 11'. Guides 11,11' are spaced apart a distance only slightly more than the width occupied by two off-set containers. The containers move through the second leg 9 in the formation as shown in the drawing. At outlet 12, the second leg 9 links up with a single-file trag 13, which the containers enter one by one without being obstructed by others.

It has been found that the above-described conveyor makes it possible to increase the speed of the conveyor belt considerably higher than is possible with known arrangements, without any jerky movements being imparted to the transported containers. The angle of each of the legs generally ranges between about 45° and about 75° to the longitudinal axis of the conveyor belt, depending on the desired nature of transport.

Various modifications are possible without departing from the scope of the invention. Thus the invention can be used for reducing multi-file arrangements to double file-transport. It may also be effective to use a multiplied construction of the conveyor system according to the invention, in which containers supplied in a large number of rows are guided into two or more zig-zag paths on a belt conveyor, resulting in as many single-file arrangements of containers.

I claim:

1. A conveyor for handling articles of uniform width in a production line to reduce disorderly or random arrangements of said articles to single-file transport comprising at least one conveyor belt disposed to transport said articles in a generally horizontal plane, a first pair of guides defining an entrance to a path to be followed by articles carried by said conveyor belt, one of said guides of said first pair having a portion converging toward said other guide of said first pair and extending transverse to the direction of transport of said conveyor belt at an acute angle therewith, said portion converging to within a distance, measured perpendicularly to the direction of transport, of slightly more than three times the width of the articles to be transported, a second pair of substantially parallel guides located downstream of said first pair of guides and defining a first leg of a zig-zag portion of said path, said second pair of guides being spaced apart a distance less than said first mentioned distance but slightly more than the width occupied by three off-set rows of said articles, a third pair of substantially parallel guides defining a second leg of the zig-zag portion of said path, said third pair of guides being spaced apart a distance slightly more than the width occupied by two off-set rows of said articles, said second leg of the zig-zag portion of said path merging into a path defined by a fourth pair of guides, said fourth pair of guides being spaced apart a distance approximately equal to the width of one of said articles.

2. Conveyor according to claim 1, wherein the legs of the zig-zag path make an angle of about 60° with the direction of transport.

* * * * *